United States Patent [11] 3,616,355

[72] Inventors Tim Themy;
Ross M. Gwynn, both of Carmichael, Calif.
[21] Appl. No. 750,017
[22] Filed Aug. 5, 1968
[45] Patented Oct. 26, 1971
[73] Assignee KDI Chloro Guard Corporation

[54] METHOD OF GENERATING ENHANCED BIOCIDAL ACTIVITY IN THE ELECTROYLSIS OF CHLORINE CONTAINING SOLUTIONS AND THE RESULTING SOLUTIONS
13 Claims, No Drawings

[52] U.S. Cl. .................................................. 204/149,
204/95, 204/128, 204/129, 204/290 F
[51] Int. Cl. ....................................................... C01b 13/04
[50] Field of Search ............................................. 204/95, 98,
99, 128, 129, 149–152, 290 F

[56] References Cited
UNITED STATES PATENTS

| | | | |
|---|---|---|---|
| 478,048 | 6/1892 | Collins .......................... | 204/149 |
| 741,690 | 10/1903 | Moller .......................... | 204/149 |
| 2,882,210 | 4/1959 | Jenks ............................ | 204/151 |
| 2,887,444 | 5/1959 | Lindstaedt .................... | 204/149 |
| 3,334,035 | 8/1967 | Dews et al. ................... | 204/149 |
| 3,378,479 | 4/1968 | Colvin et al. .................. | 304/152 |

*Primary Examiner*—T. Tung
*Attorney*—Howard E. Thompson, Jr.

ABSTRACT: An aqueous medium or dilute brine containing about 10 p.p.m. to 21,000 p.p.m. of chloride ion, and essentially free of other halogen, is electrolyzed between spaced electrodes, with the exposed surface of at least the anode being a continuous surface of a platinum metal, at a minimum potential in the general range of about 10 volts for a 21,000 p.p.m. medium to 100 volts for a 10 p.p.m. medium, and current density below about 5 amps per square inch of electrode surface, with the effluent medium at a temperature in the range of about 55° to 95° F. and preferably about 60° to 75° F., and at a pH within the range 6 to 8.5 to thereby generate in said medium chlorine together with free radicals and other oxidizing species including ozone, said ozone being present in an amount to provide at least one part by weight of ozone to each 50 parts by weight of available chlorine in said effluent. Narrowing the pH range, adjusting the effluent temperature and increasing the voltage may increase the proportion of ozone. At a pH of 7 to 8, a temperature in excess of 60° F., and a potential about 25 percent above the minimum for a particular chloride ion concentration, the proportion of ozone to chlorine is generally in excess of one part ozone to 20 parts chlorine; and at a pH of 7.2–7.8, a temperature in excess of about 66° F. and a potential about 50 percent above said minimum this proportion may be as high as one part ozone to five or ten parts chlorine. Chloride is suitably supplied as NaCl solution in varying concentrations in the fractional normality range, preferably about 0.003 N to 0.6 N corresponding with about 10 p.p.m. to 21,000 p.p.m. of chloride ion.

3,616,355

METHOD OF GENERATING ENHANCED BIOCIDAL ACTIVITY IN THE ELECTROYLSIS OF CHLORINE CONTAINING SOLUTIONS AND THE RESULTING SOLUTIONS

BACKGROUND OF THE INVENTION

The generation of chlorine by electrolysis of sodium chloride brines at an applied potential of 3.5 to 7 volts has been practical for many years in the commercial production of chlorine gas. In such production of chlorine gas the products released at anode and cathode are separately removed from the cell. The chlorine in each instance is removed as a gas while the sodium released at the cathode is recovered in different ways. In the so called mercury cell employing a mercury cathode the sodium combines with the mercury as amalgam. In other type cells such as the diaphragm type or bell jar type the released sodium in the cathode compartment reacts with water to liberate hydrogen, which is separately collected, and form sodium hydroxide which is drawn from the cell as fresh brine is added.

More recently there have developed procedures for electrolyzing sodium chloride brines and other readily dissociating chlorides including aqueous hydrochloric acid by passing the electrolyte between spaced anode and cathode, without any attempt to separate the products released in the electrolysis. When operating in the range of 3.5 to 7 volts with a constant flow of brine between the electrodes the amounts of electrolysis products liberated are generally sufficiently low to be dissolved or dispersed in the discharged electrolyte. Furthermore there is some interreaction of the chlorine with the components released at the cathode to form hypochlorite.

Adaptations of such flow-through electrolysis of brines have found considerable use in the chlorinating and hypochlorinating of waters in swimming pools, urban water supplies and the like; and by special controls to enhance the formation of hypochlorite, the basic process has been adapted to the commercial production of bleaching solution and the like.

When chlorinating water supplies the practice has generally been to treat a concentrated brine to develop therein a relatively high chlorine concentration and to blend this with water to provide the 1 to 5 p.p.m. or other chlorine content required for the intended purification. In swimming pool chlorination a practical approach has been to add sodium chloride to the pool water to provide about 2,500 to 3,000 p.p.m. of NaCl. Then in the recirculating and filtering system for the pool a portion of the recirculating water can be diverted through a cell, electrolytically fortified with chlorine, and returned to the recirculating stream. Such a system can be operated continuously or intermittently, and the voltage and/or flow rate adjusted to meet the needs of a particular size pool and the number of pool users.

One of the limitations on the more extensive use of electrolytic chlorinating in pools, water supplies, and the like has been the sensitivity of electrodes to damage and deterioration under the corrosive conditions that characterize the flow through of electrolyte between closely spaced electrodes. The anode, in particular, is sensitive to attack leading to both loss of efficiency and eventual destruction of the anode. Even electrodes carrying an electroplated deposit of platinum have poor resistance to the corrosive environment, apparently due to a porosity in the electroplated deposit; and if voltage across the cell is increased to about 10 volts the breakdown of such electroplated electrodes is quite rapid.

This problem has been solved by an improved electrode developed by applicants, and fully disclosed and claimed in the pending application Ser. No. 520,596 filed Jan. 14, 1966, now U.S. Pat. No. 3,443,055. The improved electrode comprises a laminated body of a platinum metal foil on a substrate or backing of a metal such as titanium, tantalum, or niobium (also known as columbium) which is highly resistant to electrolytic oxidation, the bonding being effected by high localized pressure and thermoelectric heat. The new electrodes have found extensive use in swimming pool chlorination, and while they have not been in use long enough to determine their actual durability in the field, they are believed, on the basis of accelerated aging tests, to have a useful life of more than 5 years when used daily for 10 to 12 hours per day.

THE INVENTION

The development of the new electrodes above mentioned has not only provided for more efficient practicing of known chlorinating processes, but it has also removed the equipment imposed limitation on voltage to be employed, since the new electrodes can withstand extended operation at 100 volts and even higher.

It has now been found that in the electrolysis of sodium chloride brines and other electrolytes providing chloride ion there is a significant change in the nature of the electrolysis products when the voltage is increased above about 10 volts, and particularly when it is above about 14 volts. The full nature of this change is not understood, but it appears to involve the generation of free radicals and/or charged or ionic species of varying stability which appreciably modify and extend the biocidal activity of the cell effluent.

Among the free radicals which may be generated are $Cl\cdot$ $'_3$, $OH\cdot$, $HO_2\cdot$ and $ClO\cdot$ Most of these are quite short lived but apparently give rise to the formation of highly oxidizing species such as $O_3$, $ClO_2$ and $H_2O_2$ which may be considered in the nature of stabilized free radicals. There is the further indication that chlorite and chlorate ions ($ClO_2{}^1$ and $ClO_3{}^1$) and/or superoxide ion ($O_2{}^1$) may be formed which in turn may generate additional free radicals and stabilized free radicals.

As earlier stated, it is not yet known just what combination of free radicals or other oxidizing components are produced in the high-voltage operation. It does appear, however, that appreciable amounts of ozone are generated and that the ozone persists, at progressively reducing levels, for a sufficient time to exert a supplementary biocidal action comparable to or even exceeding that of the chlorine and hypochlorite which normally would provide the biocidal activity.

It can be demonstrated, however, that high-voltage electrolysis of dilute NaCl solutions leads to production of at least 1 mole of free radicals for each 10 to 100 moles of chlorine; that ozone is present in the cell effluent in the proportion of about 2 to 5 parts (and occasionally as high as 20 parts) for each 100 parts of chlorine, and that the ozone persists in the cell effluent for an extended period.

In order that the reader may better visualize these factors typical test procedures and determinations will be described.

DETERMINATION OF THE EXISTENCE OF FREE RADICALS

An electrolysis unit is employed having electrodes of platinum foil bonded to a titanium metal base (by the method disclosed in said application, Ser. No. 520,596). The electrodes measure 2.25×6 inches and are supported in a plastic (methyl methaerylate) frame with the exposed platinum surfaces measuring 2×6 inches and appropriately 0.64 cm. apart. The solution to be electrolyzed is introduced at the bottom and removed at the top of the cell.

Saline solutions used are Palo Alto California tap water containing 3,000 p.p.m. of C.P. sodium chloride (approximately 0.05 molar NaCl). The solution is fed at approximately 35 ml./sec. while applying a potential of 15 volts and current of 25 amperes to the electrodes, and quantities of effluent are collected for testing. Under these conditions the effluent solution contains approximately a $10^{13}$ molar chlorine concentration.

For detection of free radicals a Varian, Model V-4502 electron paramagnetic resonance (X-band) spectrometer was used. This instrument, hereinafter referred to as the EPR apparatus is supplied by Varian Associates of Palo Alto, Calif.

As free radicals are of very short duration, being used up rapidly in forming more stable species, a free radical indicator or stabilizer is used, in the form of a 0.02 molar aqueous solution of 2,2,6,6-tetramethylpiperidine, hereinafter referred to as TMP. This solution is tested prior to use in the EPR apparatus and treated with hydrazine until no signal could be detected, and is incorporated in the saline solution or effluent in the proportion of about 10 ml. per liter.

The following test procedures were then followed with the noted results.

a. With the cell operating as described a sample of cell effluent was collected and transferred to the EPR apparatus. No signal was detected, indicating that free radicals which may have been present were consumed before reaching the EPR apparatus.

b. A 200 ml. sample of effluent collected in a beaker containing 2 ml. of the TMP solution. when this was tested in the EPR apparatus it gave a weak signal indicating a free radical concentration of about $10^{18}$ molar. The point of collection of the sample, however, was at the end of a cell outlet tube about 3 meters long, and in passage through the tube free radicals could have been consumed. Therefore the following additional tests were made.

c. A mixture of 1 liter of the saline solution and 10 ml. of the TMP solution were run through the cell under the same flow and current conditions. A sample of the resulting effluent, when tested in the EPR apparatus gave a strong triplet signal indicating a free radical concentration of about $10^{16}$ molar.

d. To be sure that the TMP did not itself generate free radicals as it passed through the cell, a fresh quantity of saline solution was electrolyzed and TMP solution, at approximately one-tenth the flow rate through the cell, was introduced into the effluent at the juncture of the cell and discharge tube. A sample of the effluent mixture, when tested in the EPR apparatus, showed the same strength of signal as in "c" above, indicating a free radical concentration of about $10^{16}$ molar.

Bearing in mind that the chlorine concentration is approximately $10^{15}$ molar the molar ratio of free radical: chlorine is approximately 1:10.

DEMONSTRATION OF EXISTENCE OF OZONE IN THE CELL EFFLUENT

Ozone is extremely difficult to detect and quantitatively determine in the presence of chlorine because most tests responsive to an oxidizing function will respond similarly to these two materials. An ozone detecting apparatus has been developed, however, which is specific to ozone and does not respond to chlorine. This apparatus, which utilized a chemiluminescence method, has been described in an article entitled "Rapid Ozone Determination Near an Accelerator" by Niderbragt, van der Horst, and van Duijn which appeared in NATURE, Apr. 3, 1955, at page 87. This apparatus cannot detect ozone or the amount thereof in an electrolyte but it can detect the presence and approximate concentration of ozone in the air above an electrolyte, which is an indirect demonstration of the presence of ozone in the electrolyte.

Stationary (no-flow) tests were conducted using electrodes of the size and spacing described above, filling the cell (about 750 ml.) with solution to be tested, and turning on the current at the voltage and amperage levels indicated below for a period of 30 seconds, with the ozone detector apparatus supported with its inlet about 10 ml. above the liquid level. A solution containing 3,000 mg./l. of NaCl (0.0513 molar) was first tested, and other solutions of approximately 0.0513 molar concentration were tested for comparative purposes. The results are tabulated below:

| Material tested | Volts | Amps | Ozone detected |
|---|---|---|---|
| NaCl | 10-12 | 20-22 | Yes. |
| NaCl | 14 | 23 | Yes—stronger. |
| NaCl | 15-16 | 26-28 | Yes—(indicator off scale). |
| NaCl | 15 | 20 | Yes, approx. 7 p.p.m. |
| HCl | 15 | 13.5 | Very intense (indicator off scale). |
| HCl, 1-4 dilution | 15 | 13.5 | Yes, approx. 2 p.p.m. |
| H₂SO₄ | 15.5 | 24.5 | Trace. |
| Na₂SO₄ | 15 | 26 | Do. |
| KH₂PO₄ | 16 | 15.5 | Do. |
| NaOH | 17 | 16 | None. |

This data indicates the special effect of chloride ion and increase in voltage on ozone production. The fact that NaOH gave no ozone was to be expected in view of the known instability of ozone under alkaline conditions.

Similar tests were run with Palo Alto tap water (5mg./l. NaCl) and solutions containing 100 mg./l. and 200 mg./l. of NaCl with the following results:

| Solution tested | Volts | Amps | Ozone detected |
|---|---|---|---|
| Tap water | 14 | 1 | No. |
| Do | 15.5 | 1 | No. |
| Do | 17 | 1 | No. |
| NaCl, 100 mg./l | 14 | 2.5 | No. |
| NaCl, 100 mg./l | 15.4 | 3 | No. |
| NaCl, 100 mg./l | 16.8 | 3.4 | No. |
| NaCl, 200 mg./l | 14 | 4 | No. |
| NaCl, 200 mg./l | 15.3 | 4.2 | No. |
| NaCl, 200 mg./l | 16.5 | 4.5 | Trace. |

This data further indicates the importance of chloride ion concentration and voltage in obtaining ozone production. It has separately been determined that significant amounts of ozone can be generated with as little as 20 p.p.m. of NaCl by operating at about 100 volts or higher. Furthermore, the transient presence of ozone can be demonstrated by the increase in oxygen level upon electrolysis of a complex system containing chloride ion. An example of this is as follows:

A series of tests were run on Palo Alto sewage which contains about 100 mg./l. or 100 p.p.m. of NaCl. Sewage and diluted sewage (4 l. diluted to 20 l. with water to which 25 ml. of KH₂PO₄ buffer was added) were passed through a cell having the electrode size (2×6 inches) and spacing (0.64 cm.) as above described at a flow rate of one liter per 24 seconds employing current at the different voltages and amperage shown below:

| Test material | Volts | Amps | pH | Cl₂ mg/l. | Diss O₂ mg./l. | Sewage odor |
|---|---|---|---|---|---|---|
| Sewage (control) | | | 7.5 | 0 | 0 | Yes. |
| Sewage | 15 | 7 | 7.9 | 0 | 2.5 | Barely. |
| Do | 32 | 19 | 8 | 0.8 | 3.2 | No. |
| Do | 70 | 42 | 7.8 | 1 | | No. |
| Diluted sewage | 72 | 20 | 7.5 | 0 | 6.8 | No. |
| Do | 110 | 20 | 7.8 | 0 | 7.4 | No. |

A composite sample of all electrolyzed samples showed a BOD of 82 mg./l. compared with 230 mg./l. for the raw sewage control.

The build up of the dissolved oxygen concentration is considered to reflect the increased generation of ozone with the voltage increases, which ozone reacts immediately with the organic soil to release oxygen.

METHOD OF ANALYSIS FOR CHLORINE AND OZONE

Having thus demonstrated that substantial amounts of ozone are formed in high voltage electrolysis of aqueous media containing chloride ion, it becomes possible to measure quite accurately the amounts of chlorine and ozone in a cell effluent by the following two-stage method of analysis which is based on a procedure outlined in Scott's Standard Method of Chemical Analysis 5th Edition.

a. To an aqueous sample, suitably about 100 ml., containing chlorine and ozone is added 2 g. of KI crystals and a slight excess of acetic acid (to pH 3.0 to 4.0). Titrate the liberated I₂ with 0.1 normal (or other known normality) Na₂S₂O₃ until the yellow color becomes very pale. Then add starch indicator and titrate until the blue color entirely disappears.

Calculate the total Cl₂+O₃ as Cl₂ equivalent by the following formula in which N is the normality of the Na₂S₂O₃.

$$\text{mg. Cl}_2 \text{ (equiv.)}/l = \frac{(\text{ml. Na}_2\text{S}_2\text{O}_3) \ (N) \ (35.46)}{\text{ml. sample}} \times 1000$$

b. The same procedure is followed with a second sample to which NaOH has been added to raise the pH to 10 to destroy the ozone, followed by acidification to below pH 7 with acetic acid. This titration measures the $Cl_2$ alone.

By subtracting the values in titration "b" from the value in titration "a" the difference represents the quantity of ozone in terms of mg. $Cl_2$ (equiv.)/liter. This value multiplied by the factor 48/70.91 (or 0.677) provides the approximate mg./1. of $O_3$. It is quite possible that other oxidizing species may be present along with the ozone and also inactivated by the alkaline treatment, in which event the approximate mg./1. of $O_3$ as thus determined could be somewhat higher than the true $O_3$ concentration.

Ozone may also be determined directly and much more accurately by the spectrophotometry method described by P. Koppe and A. Muhle in z. Anal. Chem. 210(4), 214-256 (1965).

COMPARATIVE PRODUCTION OF CHLORINE AND OZONE FROM DIFFERENT SOURCES

Using the no-flow procedure above described in which 750 ml. of test solution is electrolyzed for 30 seconds at the indicated current and potential, a number of different solutions were treated and then analyzed for $Cl_2$ and $O_3$ by the method above described. Pertinent data on these tests are tabulated below. Solution temperatures were approximately 23° C. (73.4° F.) at the start unless otherwise indicated.

| No. | Solution | Volts | Amps | Ozone, mg./l. | Available chlorine, mg./l. |
|---|---|---|---|---|---|
| 1 | 3,000 p.p.m. NaCl | 15 | 24 | 5 | 110 |
| 2 | 3,000 p.p.m. NaCl | 7 | 7 | 0 | 15 |
| 3 | 3,000 p.p.m. NaCl plus HCl to pH 4. | 13.5 | 30+ | 0.5 | 126 |
| 4 | 3,000 p.p.m. NaCl plus NaOH to pH 10. | 14.5 | 24 | 0 | 28 |
| 5 | 2,800 p.p.m. NaCl plus 500 p.p.m. NaI. | 14 | 25 | 0 | 70 |
| 6 | 2,200 p.p.m. LiCl | 14.5 | 25 | 0.25 | 113 |
| 7 | 3,800 p.p.m. KCl | 14 | 30+ | 0.7 | 98 |
| 8 | 2,850 p.p.m. $CaCl_2$ | 14.5 | 30+ | 0.5 | 112 |
| 9 | 2,450 p.p.m. $MgCl_2$ | 15 | 25 | 0.4 | 42 |
| 10 | 3,000 p.p.m. KBr | 16 | 19 | 0 | |
| 11 | 3,000 p.p.m. KI | 16 | 12.5 | 0 | |
| 12 | 3,000 p.p.m. NaF | 14 | 30+ | 0 | |

The foregoing data indicates that:

a. Halide solutions other than chloride suppress or inhibit ozone formation, and that the presence of another halogen can reduce or prevent the ozone production even though a preponderant amount of chloride ion is present.

b. Significant amounts of ozone are produced when other soluble metal cations are substituted for the sodium.

It is well known that ozone is a very active biocidal agent, more active in most instances than chlorine. Thus the ability to generate useful amounts of ozone along with chlorine in electrolysis of chloride containing solutions is in itself a highly advantageous development for many disinfecting, sanitizing and other biocidal purposes. Furthermore, the ozone-chlorine-free radical environment created by the high-voltage electrolysis appears to prolong or regenerate available chlorine activity. In a sense the chlorine-ozone association, possibly influenced by unidentified free radicals or other active species, provides a synergistic biocidal action substantially exceeding that which could normally be attributed to the chlorine and ozone separately.

Turning now to the practical adaptations of the present invention, they are as numerous as the various known needs for biocidal activity. Furthermore they involve several different procedural approaches depending on factors such as availability of chloride ion in the water to be treated, the quantity of medium to be treated, whether continuous operation or intermittent operation is called for, and closely related thereto, whether equipment cost or operating cost is the more important economic factor. While the procedural approach may be widely varied to meet particular needs, most adaptations of the invention will fall in one of the following categories.

a. Flow through electrolysis of the total volume of a natural chloride containing medium such as domestic water or central water supply containing at least 10 p.p.m. of $Cl^1$, raw sewage containing at least 100 p.p.m. of $Cl^1$, and other naturally occurring media such as blood and sea water.

b. Flow through electrolysis of the total volume of a chloride enriched medium such as swimming pool water having 2,500–3,000 p.p.m. of NaCl, for preparing heavy duty sanitizing and disinfecting solutions and/or bacterial warfare decontamination agents.

c. Flow through electrolysis of a diverted portion of a chloride containing medium, particularly as a modification of the procedure described in "b" above for treating swimming pool water.

d. Flow through electrolysis of a diverted portion of a medium with controlled addition of chloride to the diverted portion prior to electrolysis, and return of the diverted portion to the main body of medium after treatment.

e. Flow through electrolysis of a separate, high chloride (1,000 to 35,000 p.p.m. NaCl) medium for controlled addition to a medium to be treated.

f. Flow through electrolysis of a body of chloride solution to build up a desired $Cl_2$ and $O_3$ level while introducing brine and withdrawing enriched solution at a relatively slow rate.

g. Modification of procedures "a" to "e" conducted on a no-flow basis with a given volume of static or agitated medium with residence time, or duration of current flow, providing control of chlorine generation.

Typical uses for one or more of these procedures include, with limitation:

1. Swimming pool treatment.
2. Treatment of domestic or community drinking water.
3. In hospitals, doctors offices, and in the home for preparing sanitizing and disinfecting solutions of selected chlorine and ozone content.
4. Treatment of sewage.
5. Pollution control in rivers and harbors; and algae control in lakes.
6. Treatment of air conditioners cooling waters to control algae.
7. Preparation of agricultural disinfectants such as egg wash, and dairy equipment sterilization.
8. Industrial sanitation and/or sterilization in laundries, restaurants, food processing industries and the like.

The following examples will show specific adaptions of the invention in each of the procedural categories above mentioned, but it is to be understood that these examples are given by way of illustration and not of limitation. In these examples the electrodes in each instance are of platinum foil bonded to a titanium substrate according to the disclosure of said pending application, Ser. No. 520,596. In certain of the examples cells may be identified as 3A, 6A, 9A, and 18B cells. In such event they are cells of the type disclosed in applicants' pending application, Ser. No. 642,951 filed June 1, 1967 now U.S. Pat. No. 3,479,275, wherein the electrodes are so supported in a plastic (methyl methaerylate resin) frame that more than 99 percent of the flow through the cell, from bottom to top, passes between the electrodes, and the space outside the electrodes is occupied by an essentially static body of the circulating medium. The sizes and electrode spacings of these electrodes are:

| | Length | Width | Spacing |
|---|---|---|---|
| 3A | 3" | 2" | 0.64 cm. |
| 6A | 6" | 2" | 0.64 cm. |
| 9A | 9" | 2" | 0.64 cm. |
| 18B | 18" | 2" | 1.28 cm. |

In the examples values are sometimes given for both chlorine and ozone yield in the cell effluent. In other instances the yield is expressed as chlorine equivalent by thiosulfate test. While such yields are primarily chlorine, it is to be understood that small amounts of ozone and other oxidizing species are also present and react with the thiosulfate to give a reading which is somewhat higher than the chlorine per se. As the ozone and other oxidizing species have bacteriacidal action comparable to or greater than that of chlorine, the recording of the combined oxidizing species as "chlorine equivalent" permits realistic evaluation of the cell effluents.

EXAMPLE I

In a domestic water system, suitably containing a holding tank where treated water can be stored for use as delivered from a well or other source providing water containing at least 20 p.p.m. of NaCl, a 9A cell as above described is installed in such delivery line. The cell will handle a flow of up to 6 gallons per minute. In order to provide 1 2 p.p.m. of chlorine equivalent by thiosulfate test in the treated water, assuming a water feed of 4 gal./min. and a water temperature of 50°–55° F., the proper current based on NaCl in the water can be estimated from the following table:

| Salinity | Volts | Amps |
| --- | --- | --- |
| 50 p.p.m. | 100 | 11 |
| 100 p.p.m. | 45 | 9 |
| 150 p.p.m. | 22 | 5 |

Example II

In a city water supply having a flow of 300 gal./min., and containing 150 p.p.m. of NaCl an electrolytic cell is installed in the feed line having platinum coated electrodes as above described measuring 4×18 inches and spaced 2 inches apart. The flow rate between the electrodes is about 12.5 feet per second. At a water temperature of 50°–55° F., and with a potential of 200 volts and current of 2 amps applied to the electrodes the treated water will contain 1 to 2 p.p.m. of chlorine.

EXAMPLE III

As an alternate method of treating the water supply described in example II a salt solution at 50 ° F. containing 5,000 p.p.m. of NaCl is fed through a 9A cell at a rate of 0.75 gallons per minute at a potential of 22 volts and current of 180 amps. A test of the cell effluent shows 300 p.p.m. of $Cl_2$ and 15 p.p.m. of $O_3$. Blending this effluent with the city water at the rate of 1 gal. per 300 gallons provides a desired chlorine level of 1 p.p.m. and about 0.05 p.p.m. of ozone.

EXAMPLE IV

A sample of raw sewage at 50° F. containing about 100 p.p.m. of NaCl was fed through a 9A cell with applied potential of 15 volts at the rate of 1 gal./min.

Data was collected on the input and output fluid on 12 test runs and the values averaged as follows:

| | Input | OUtput | Units |
| --- | --- | --- | --- |
| Dissolved Solids | 104 | 70 | p.p.m. |
| B O D | 114 | 105 | mg./l. |
| Coliform | 1,524,000 | 400,000 | organisms |
| Dissolved $O_2$ | 0.85 | 1.65 | p.p.m. |

In this series of runs the current flow was so low as to not register on the available ammeter. The tests indicate, however, that the applied voltage, even with negligible current flow, has a marked effect upon the sewage.

EXAMPLE V

A 30,000 gal. swimming pool has a recirculating system with a flow of about 60 gal./min. (equivalent to a complete change of water every 8 hours). In the line between the filter and the pool and 18B cell is installed to carry the full flow of water. Salt is added to the pool water to provide a 3,000 p.p.m. NaCl concentration. With a water temperature of about 78° F. the cell is operated at 17 volts and 25 amps. The return water setup pool tests at described 3 p.p.m. of chlorine equivalent. After about 6 hours of operation with little or no organic load the pool reaches a 6about 1 p.p.m. chlorine equivalent. This level is readily maintained by operation of the cell 12 to 20 hours per day depending on the extent of use and/or the amount of contaminates being introduced into the pool.

The procedure in this example has the drawback of exposing the electrodes to excessive wear particularly due to large quantity and rapid flow of the circulating water. This problem is eliminated by the modified procedure of the following examples.

EXAMPLE VI

In a pool setup similar to that described in example V about 5 percent of the fluid flow leaving the filter is diverted to a branch line containing a 6A cell, the discharge from the cell rejoining the main stream at the intake side of the circulating pump. When this cell is operated at 17 volts and 18 amps with a flow rate through the cell of about 3 gal./min. and water temperature of about 78° F. the cell effluent is found to contain 25 p.p.m. of chlorine equivalent. After an initial buildup in the pool a chlorine level of about 1 p.p.m. is maintained throughout the pool by operating the cell 12 to 20 hours a day, depending on the swimming load. The circulation of the cell effluent through the filter prior to return to the pool has the beneficial effect of lowering the contamination on the filter. If the cell were located between the filter and the pool the chlorine level of the pool could be maintained with less operation of the cell, but more frequent backwashing of the filter would probably be required.

EXAMPLE VII

A pool of the size described in example V, and having a similar circulating system, but without the 3,000 p.p.m. of added salt in the pool water, is provided with a branch line between filter discharge and the suction side of the pump to carry about 5 percent of the fluid flow. Into this branch line is metered a concentrated brine, and the mixture is passed through a 6A cell conveniently located in said branch line. The mixture entering the cell contains about 3,000 p.p.m. NaCl. A flow of brine through the cell at 17 volts and 18 amps at the rate of 0.75 gal./min. provides an effluent containing 100 p.p.m. chlorine equivalent. As this effluent is delivered to the main recirculating stream it is reduced to about 3 p.p.m. chlorine equivalent, and a pool level of about 1 p.p.m. chlorine can be maintained by operating the cell 12 to 20 hours a day depending on the extent of pool use.

When a particular chlorine level such as 1 p.p.m. has been established in the pool by any of the methods described in examples V and VII it has been found that if the pool is not used by swimmers the chlorine level may hold for 36 to 48 hours, or even longer with very little change. Possibly this is due to the lingering effect of traces of ozone or more active species acting to liberate available chlorine from other chlorine containing species.

EXAMPLE VIII

An air conditioning cooling tower for recirculating water over which the water is circulated at the rate of about 30 gallons per minute developed algae deposits on the cooling racks at the rate of 1 inch or more per week requiring shut down and removal of algae deposits every 2 to 3 weeks.

The warm water line to the tower was provided with a branch line diverting about 10 percent of the flow and concentrated brine was metered into this branch line to provide approximately 3,000 p.p.m. of NaCl. This mixture was passed through a 9A cell inserted in the branch line and the cell was operated at about 17 volts and about 10 amps. The cell effluent when recombined with the recirculating water stream provided in said stream a chlorine equivalent of about 2 p.p.m. By passing this chlorine enriched water to the tower during all periods of operation the formation of algae was completely eliminated.

This procedure will gradually cause a buildup of NaCl in the circulating water and as this buildup progresses, smaller amounts of brine will be needed to provide 3,000 p.p.m. of NaCl in the solution entering the electrolytic cell. In fact, when the salt content of the recirculating water has risen to about 3,000 p.p.m. the supplemental feed of brine can be eliminated. In most installations a salt concentration of the order of 3,000 p.p.m. is not sufficient to cause any corrosion problem in equipment (generally a salt concentration of about 6,000 p.p.m. or higher is required to cause a significant corrosion problem). On the other hand, if in a particular situation a salt concentration of 3,000 p.p.m. in the circulating water would be considered excessive, the system can be made to generate comparable amounts of chlorine equivalent at a substantially lower salt concentrations by operating the cell at higher voltage.

EXAMPLE IX

A small 3A cell can provide saline solutions of widely varying chlorine and ozone concentration in practical quantities for home use, doctor's and dentist's offices, and the like. A few typical solutions are prepared as follows:

|   | Salinity, p.p.m. NaCl | Volts | Amps | Gal./hour | Effluent temp., °F. | Chlorine equivalent, p.p.m. |
|---|---|---|---|---|---|---|
| a | 500 | 100 | 4 | 3 | 64 | 50 |
| b | 2,700 | 19 | 9.5 | 8.5 | 64 | 74 |
| c | 3,400 | 19.5 | 10 | 7 | 67 | 104 |
| d | 5,000 | 22 | 20 | 7 | 67 | 300 |

It will be understood that effluents of lower, higher, or intermediate chlorine concentration can be obtained by suitable adjustment of the salinity, applied voltage, and flow rate through the cell. Furthermore the effluents can be used full strength or diluted to suit particular disinfecting and sanitizing needs. They can also be stored for extended periods in closed containers, solutions stored for several weeks showing little loss of activity.

The uses to which the effluents, or suitable dilutions thereof, can be put are as varied as the needs for sanitizing or disinfecting treatment of people and things around home, doctors' and dentists' offices, hospitals and the like. By way of illustration solutions having a chlorine equivalent of 25 to 100 p.p.m. have been effectively used as gargles, solutions for the cleaning of wounds including irrigation of abdominal wounds, and sterilization of the transfer tissue and graft site in skin grafting. At higher concentrations of 300 to 1,000 p.p.m. of chlorine equivalent, solutions are effectively used for sterilization of instruments, sterilization of the hands in preparation for and during surgery and related purposes where high bactericidal action is required. Even at the 1,000 p.p.m. concentration, the solutions are surprisingly nonirritating.

Bottled quantities of solution are practical for travelers, campers, or the like. For example, a solution of 100 to 300 p.p.m. chlorine equivalent concentration provides a versatile solution for full strength or diluted use in meeting the needs for germicidal and disinfecting action when traveling or camping. An ounce of 100 p.p.m. solution added to a quart of water of questionable purity would provide a chlorine content of about 3 to 5 p.p.m., thus assuring the safety of questionable water. In this connection, it is significant to note that no taste of chlorine in the treated water can be detected until the chlorine equivalent level reaches about 3 p.p.m. This is in distinct contrast to water treated with chlorine gas in which the chlorine can generally be tasted at concentrations as low as 0.3 or 0.5 p.p.m.

Both the absence of taste below concentrations of 10 p.p.m. chlorine equivalent and the nonirritating nature of solutions having as high as 1,000 p.p.m. chlorine equivalent, serve to emphasize the unique nature of the cell effluents when subjecting sodium chloride solutions to high voltage electrolysis.

While the foregoing examples have been based primarily on flow-through operation in which saline solution is passed between electrodes of a cell, it will be understood that comparable results can be achieved with limited volumes of salt solution in a stationary cell and with the extent of electrolysis controlled by the duration of the applied current. The following example will serve to illustrate a practical adaptation of such stationary or no-flow operation.

EXAMPLE X

A small cell having platinum coated electrodes of the type described approximately 0.75 inch wide, 1.75 inches long and spaced apart by 0.75 inch provides a chamber between the electrodes having a capacity of approximately ½ fluid ounce. The electrodes are connected to a suitable plug for insertion in the conventional automobile cigarette lighter socket. When salt solution is placed in the cell and the plug inserted in the lighter socket, fed by a 12 volt battery, electrolysis readily takes place as evidenced by the bubbling of the solution between the electrodes.

If salt solution of about 5,000 p.p.m. concentration (which is slightly salty to the taste) is placed in the cell and electrolyzed for about 30 seconds, this develops in the solution a chlorine equivalent of approximately 100 p.p.m. The resulting half ounce of chlorinated solution could be used directly for cleaning and dressing of a wound or could be put to other disinfecting uses. For example, addition of the half ounce of solution to a pint of questionable water would make it safe for drinking without creating any objectionable chlorine taste.

The unit above described is therefore a practical unit for the traveler or camper. Furthermore, it would be apparent that fixed cells of somewhat larger size could be practical for the home or even for doctors' and dentists' offices and the like.

In examples I to X no attempt has been made to measure active species other than chlorine and ozone. It is to be understood, however, that the presence of detectable amounts of ozone is an indication of a substantial free radical generation in the electrolysis. It had been clearly demonstrated that this free radical and ozone production results from employing a potential of at least 10 volts and preferably at least 14 volts in the electrolysis.

The minimum voltage required to produce useful quantities of ozone varies with the salinity or the chloride ion concentration. Within the fractional normality range of about 0.0003N to 0.6N NaCl it has been found that there should be a potential of at least 100 volts for 0.0003N solution or chloride ion concentration of about 10 p.p.m., and at least 10 volts for a 0.6N solution or chloride ion concentration of about 21,000 p.p.m. The following table will more clearly indicate the general relationship between minimum voltage and chloride ion concentration.

| Chloride Ion concentration, p.p.m. | Minimum voltage | Major uses |
|---|---|---|
| 10 | 100 | Treatment of natural chloride containing aqueous media. |
| 200 | 20 | Treatment of media in which chloride ion content has been supplemented by water soluble chloride. |
| 3,000 | 14 | Treatment of water enriched with chloride ion for combination with other aqueous media in the chlorination thereof. |
| 21,000 | 10 | |

Increasing the voltage above the minimum value for a given chloride ion concentration will increase the yield of both chlorine and ozone, and will generally increase the ozone:chlorine ratio. Thus at a voltage about 25 percent above the minimum value for a particular chloride ion concentration, and at favorable pH and temperature conditions as hereinafter described, the ozone to chlorine ratio is generally in excess of 1 part ozone to 20 parts chlorine, and at a voltage 50 percent above such minimum this ratio may be as high as 1 part ozone to 5 to 10 parts chlorine.

The pH of a medium is also an important factor and for production of useful amounts of ozone (i.e., at least 1 part by weight per 50 parts of chlorine) the pH should be within the range of 6 to 8.5. When seeking an ozone:chlorine ratio of the order of 1:20, the pH range should be narrowed to about 7 to 8, and for maximum ozone production a pH of 7.2 to 7.8 is preferred. Chlorine production, however, is favored by a slightly lower pH, and adjustment of pH is therefore a practical way to vary the chlorine:ozone ratio in a cell effluent, Temperature of the electrolyte in and leaving the cell has an important influence on the amount of ozone generated. While temperatures within the range of about 55° to 95° F. can be employed, substantially higher ozone yields are obtained if the effluent temperature is in the 60° to 75° F. range; and at a temperature in excess of about 66° F. and pH of 7.2 to 7.8 the proportion of ozone may be as high as one part by weight to each 5 to 10 parts by weight of chlorine.

Depending on the chloride ion concentration, the cell size, flow rate and applied voltage and current, small to relatively large amounts of heat can be generated within the cell, but in any flow-through operation the fluid input temperature is a major factor in determining the effluent temperature. It is sometimes desirable, therefore, to preheat the input water or solution, particularly if its temperature is below about 55° F. Warming the electrolyte increases ion mobility and hence conductance, particularly at the more dilute saline concentrations.

Thus it appears that temperature and pH, as well as the voltage applied to a solution containing chloride ion within a cell are closely related or interdependent factors in creating the high incidence of free radicals and advantageous yields of ozone which characterize the methods herein disclosed.

Compared with a typical hypochlorite cell, the method of the present invention electrolyzes a much more dilute brine or saline solution, i.e. a solution having a much lower chloride ion concentration, at a much higher voltage, obtaining lower conversions and current efficiencies Usually the current density is less than 5 amperes per square inch, or less than 3 amperes per square inch with more dilute brines. With more concentrated brines, i.e., those approaching 21,000 p.p.m. of chloride ion, current densities somewhat higher than 5 amperes per square inch can be practical, since maximum current density increases with the saline, or chloride ion, concentration, while voltage decreases.

The practical variations in voltage and amperage are considered to be those variations which provide a watt density of 10 to 100 watts per square inch of electrode surface. Within this range the lower values apply primarily for the more dilute brines, while the higher values e.g., 30 to 100 watts per square inch apply primarily for the more concentrated brines. It will be understood, however, that voltage, current density, and watt density in any particular installation can vary substantially with changes in other variables such as temperature, flow rate, or fluctuations in the chloride ion concentration of the medium being electrolyzed.

It should be emphasized that the practical utilization of the methods herein disclosed is dependent on employing spaced electrodes, with the exposed surface of at least the anode having a continuous surface of a platinum metal. In systems intended for periodic reversal of electrode polarity it follows that both electrodes must have such continuous surface of a platinum metal. On the other hand, when polarity is not to be reversed the cathode can be formed of nickel, stainless steel, or other conventional cathode material. In adapting the invention to different uses it has been indicated in the foregoing examples that the size and spacing of electrodes can be varied to accommodate the quantity of electrolyte to be treated. It is to be understood, however, that the invention also contemplates the use of two or more cells for the simultaneous (parallel) and/or successive (series) treatment of brines and other electrolytes containing chloride ion.

Various changes and modifications in the procedures herein described will occur to those skilled in the art, and to the extent that such changes and modifications are embraced by the appended claims, it is to be understood that they constitute part of the present invention.

We claim:

1. The process that comprises electrolyzing an aqueous medium containing about 10 p.p.m. to 21,000 p.p.m. of chloride ion and essentially free of other halide ions between spaced electrodes, with the exposed surface of at least the anode having a continuous surface of a platinum metal, at a watt density of about 10 to 100 watts per square inch of electrode surface, the maximum current density being about 5 amperes per square inch of electrode surface, and the minimum potential being about 10 volts, with the effluent medium at a temperature in the range of about 55°–95° F., and at a pH within the range of about 6 to 8.5, to thereby generate in said medium chlorine together with free radicals and other oxidizing species including ozone, said ozone being present in an amount to provide at least one part by weight of ozone to each 50 parts by weight of available chlorine in said effluent.

2. The process as defined in claim 1 wherein said minimum potential is within the general range of about 10 volts for a 21,000 p.p.m. medium to about 100 volts for a 10 p.p.m. medium.

3. A biocidally active aqueous medium obtained by the process as defined in claim 2.

4. The process as defined in claim 2 wherein the electrode potential is about 25 percent above the minimum value for a particular chloride ion concentration, the pH is in the range of 7 to 8, the effluent temperature is in the range of 60° to 75° F., and the ozone is present in the effluent in the proportion of at least 1 part to each 20 parts by weight of chlorine.

5. The process as defined in claim 4 wherein the electrode potential is about 50 percent above the minimum value for a particular chloride ion concentration, the pH is in the range of 7.2 to 7.8, , the effluent temperature is in excess of 65° F., and the ozone may be present in the effluent in proportions as high as 1 part ozone to each 5 to 10 parts by weight of chlorine.

6. The process as defined in claim 1 wherein said aqueous medium is a sodium chloride solution having a normality within the range of about 0.0003N to 0.6±N.

7. The process as defined in claim 1 wherein the aqueous medium is passed between spaced electrodes at a predetermined voltage and the extent of electrolysis is essentially proportional to the flow rate of the medium.

8. The process as defined in claim 7 wherein a portion only of a main stream of aqueous medium is diverted from the main stream and after being electrolyzed between said spaced electrodes is recombined with said main stream.

9. The process as defined in claim 8 wherein the chloride content of said diverted portion is supplemented before passing said diverted portion between said spaced electrodes.

10. The process as defined in claim 1 wherein a fixed quantity of the aqueous medium is exposed to the electrodes, and the extent of electrolysis is essentially proportional to the duration of the application of voltage across the electrodes.

11. The process as defined in claim 1 wherein a medium containing about 10 to 200 p.p.m. of chloride ion is electrolyzed at a potential within the general range of at least 100 volts with a 10 p.p.m. medium to at least 20 volts with a 200 p.p.m. medium, said process being particularly adapted to the treatment of natural, chloride containing aqueous media.

12. The process as defined in claim 1 wherein a medium containing about 200 to 3,000 p.p.m. of chloride ion is electrolyzed at a potential within the general range of at least 20 volts with a 200 p.p.m. medium to at least 14 volts with a 3,000 p.p.m. medium, said process being particularly adapted for the treatment of aqueous media in which the chloride ion content has been supplemented by the addition of water soluble chloride.

13. The process as defined in claim 1 wherein a medium containing about 3,000 to 21,000 p.p.m. of chloride ion is electrolyzed at a potential within the general range of at least 14 volts with a 3,000 p.p.m. medium to at least 10 volts with a 21,000 p.p.m. medium, said process being particularly adapted to the treatment of water enriched with chloride ion for combination with other aqueous media in the chlorination thereof.

* * * * *